United States Patent [19]

Hatanai et al.

[11] Patent Number: 4,638,391
[45] Date of Patent: Jan. 20, 1987

[54] VERTICAL RECORDING MAGNETIC HEAD HAVING SINGLE CORE BODY BONDED WITH MAIN MAGNETIC POLE IN GUARD LAYER

[75] Inventors: Takashi Hatanai, Koide; Keishi Nakashima, Yunotani; Koichi Mukasa, Koide, all of Japan

[73] Assignee: Alps Electric Co., Ltd., Japan

[21] Appl. No.: 619,034

[22] Filed: Jun. 11, 1984

[30] Foreign Application Priority Data

Sep. 6, 1983 [JP] Japan ............................. 58-101747
Sep. 6, 1983 [JP] Japan ............................. 58-101748
Nov. 6, 1983 [JP] Japan ............................. 58-103540

[51] Int. Cl.$^4$ .......................... G11B 5/12; G11B 5/22
[52] U.S. Cl. ................................. 360/125; 360/122
[58] Field of Search ........................ 360/125–127, 360/122, 123, 119

[56] References Cited

U.S. PATENT DOCUMENTS 4,383,284 5/1983 Isshiki ............................ 360/122
4,390,916 6/1983 Chow et al. ................... 360/122

Primary Examiner—Robert S. Tupper
Attorney, Agent, or Firm—Guy W. Shoup

[57] ABSTRACT

A vertical recording magnetic head of a main pole magnetizing type is made of a magnetic core having a central leg and two side legs, while an electromagnetic coil is supported around the central leg for exciting the same. A non-magnetic member is secured to the magnetic core so as to cover the central leg and the two side legs, and a magnetic thin layer, which is operable as the main pole, is provided in the non-magnetic member at a position overlying the central leg of the magnetic core such that the thin layer extends vertically to a recording medium moved in contact with the non-magnetic member.

9 Claims, 22 Drawing Figures

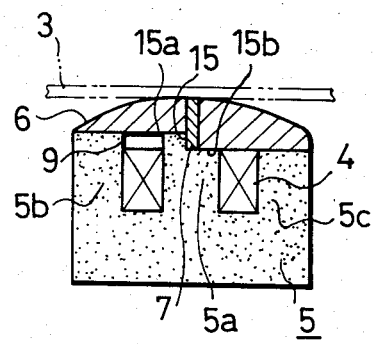
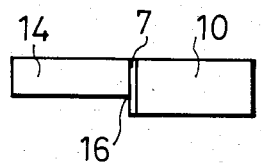
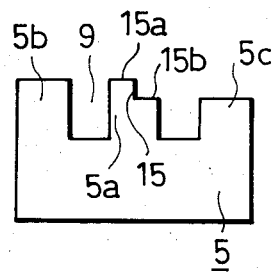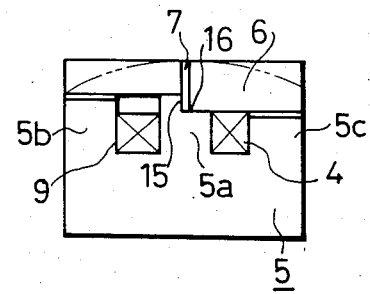

VERTICAL RECORDING MAGNETIC HEAD HAVING SINGLE CORE BODY BONDED WITH MAIN MAGNETIC POLE IN GUARD LAYER

BACKGROUND OF THE INVENTION

This invention relates to a magnetic head of a main pole magnetizing type for recording information vertically in a magnetic medium.

Heretofore magnetic heads of main pole magnetizing type have been known for advantageously recording data vertically on one side of a recording medium 3 comprising a base film 1 and a magnetic layer 2 as shown in FIG. 1.

A typical construction of such a magentic head comprises a core 5 made of a soft magnetic material having a magnetizing coil 4 embedded near the end engaging the magnetic medium, a guard member 6 of non-magnetizing material secured to an upper part of the core 5, and a thin magnetic layer 7 provided between the opposing surfaces of each half of the cores 5 and the guard member 6. A conventional method of producing the magnetic head is shown in FIGS. 2(a) through 2(e). A groove 9 is formed on the upper surface of a core material 8 formed of a soft magnetic material such as ferrite, Sendust, laminated Permalloy and the like (see FIG. 2(a)) and having the shape of a bar of rectangular section. The surface of the core material 8 containing the groove is then inclined as shown in FIG. 2(b), and a body of material 10 is placed over the inclined surface to form a planar top surface, as shown in FIG. 2(c). The body of material 10 is to form the guard member 6 and is comprised of a wear-resistant, non-magnetizing material such as a ceramic, glass, a composite material of carbon and metal or the like bonded to the inclined surface by fusing with glass or the like. Then a surface 12 of the combination 11 of the core material 8 and the planar material 10, on which a thin magnetic layer 7 constituting the main pole is to be formed, is ground, and on this surface 12 is deposited a thin magnetic layer 7 of, for instance, Permalloy or amorphous cobalt-zirconium by use of a vapor-deposition, sputtering, plating process or the like, with the combination 11 thus formed with the magnetic thin layer 7 being thereafter annealed to form the structure of FIG. 2. Then another combination 13 subjected to the production steps FIGS. 2(a) through 2(c) is bonded to the combination 11 (see FIG. 2(e)), and the thus bonded product is ground on the upper surfaces of the planar material 10 to form the curved surface of the guard member 6, as shown by dotted line in FIG. 2(e). The elongate product is then sliced into pieces each having a desired thickness, and a magnetizing coil 4 is wound in the groove 9 of the core 5 of each piece to provide a magnetic head.

However, the combination 11 has to be annealed after the deposition of the thin magnetic layer 7, and this annealing serves to increase the demagnetizing force of the soft magnetic core material 8, thus deteriorating the property of the same.

SUMMARY OF THE INVENTION

An object of the present invention is to provide a vertical recording magnetic head of a main pole magnetizing type wherein the above described drawback of the conventional magnetic head can be substantially eliminated, and the demagnetizing force of the core material can be reduced regardless of its simple construction.

Another object of the invention is to provide a vertical recording magnetic head of a main pole magnetizing type wherein not only the demagnetizing force of the core material can be reduced, but also the magnetic reluctance thereof can be maded comparatively small.

According to the present invention, there is provided a vertical recording magnetic head of a main pole magnetizing type comprising a magnetic core supporting an electromagnetic coil, and a non-magnetic member secured onto the magnetic core and including the thin magnetic layer. The thin magnetic layer serves as the main pole and is disposed vertically to a recording medium.

BRIEF DESCRIPTION OF THE DRAWINGS

In the accompanying drawings:

FIG. 9 is a vertical sectional view of a third embodiment of the invention;

FIG. 10 is a diagram showing a production step for a non-magnetic member used in the third embodiment; and FIGS. 11(a) and 11(b) are diagrams showing production steps for a magnetic core used in the third embodiment.

DESCRIPTION OF THE PREFERRED EMBODIMENTS

Figure 1:
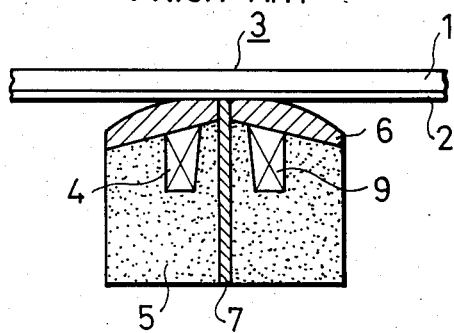
FIG. 1 is a vertical sectional view of a conventional magnetic head.
Figure 2A:
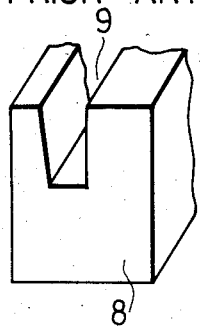
FIGS. 2(a) through 2(e) are diagrams showing production steps of the conventional magnetic head.
Figure 2B:
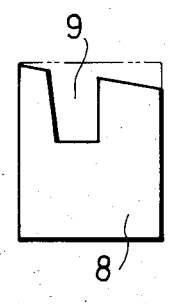
Figure 2C:
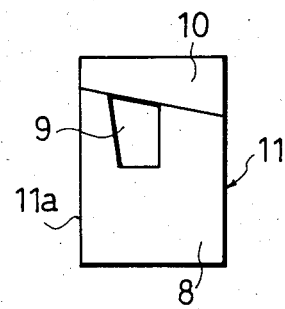
Figure 2D:
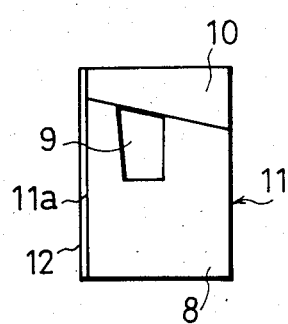
Figure 2E:
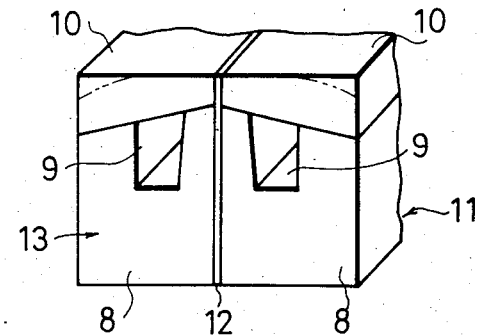

A preferred embodiment of the present invention will no be described with reference to FIGS. 3 to 5(d), wherein similar members as those in FIGS. 1 through 2(e) are designated by similar reference numerals.

Figure 3:
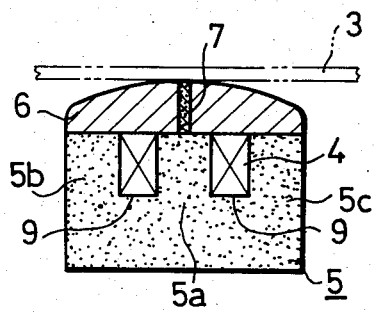
FIG. 3 is a vertical sectional view of an embodiment of the present invention.

As shown in FIG. 3, a magnetic head of the first embodiment comprises a magnetic core 5 having grooves 9 formed in its upper portion to provide a central leg 5a and two side legs 5b and 5c separated from each other by the two grooves 9. An electromagnetic coil 4 is received in the grooves 9, and a guard member 6 made of a nonmagnetic material is secured to the upper surface of the magnetic core 5. A thin magnetic layer 7 serving as a main pole is provided in the guard member 6 at a position overlying the central leg 5a, the thin layer 7 extending vertically to the surface of the central leg 5a contacting the guard member 6.

The magnetic head of the above described construction can be produced as follows.

Figure 4A:
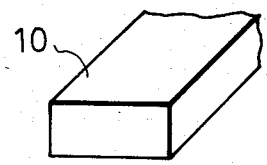
FIGS. 4(a) through 4(c) are diagrams showing production steps of a non-magnetic member used in the embodiment of the invention.
Figure 4B:
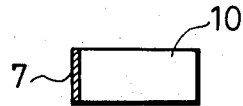
Figure 4C:
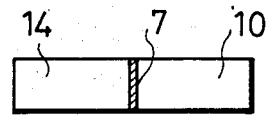

A thin magnetic layer 7 of Permalloy, an amorphous cobalt-zirconium or the like is formed on one side surface of a planar bar 10 made of a wear-resistant, nonmagnetic material such as a ceramic, glass, a composite material of carbon and metal or the like by way of vapor deposition, sputtering, plating or the like, as shown in FIGS. 4(a) and 4(b). The bar 10 provided with the magnetic thin layer 7 is then subjected to an annealing process. Another planar bar 10 of the same material and shape is then bonded to the thin magnetic layer 7 deposited on the first-mentioned bar 10 by use of a bonding agent of glass or the like, to form the composite structure of FIG. 4(c).

Figure 5A:
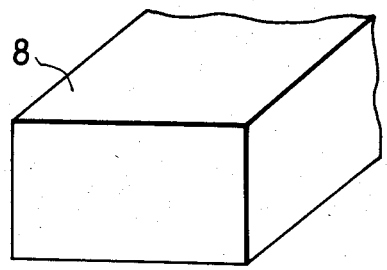
FIGS. 5(a) through 5(d) are diagrams showing production steps for a magnetic core used in the embodiment of the invention.
Figure 5B:
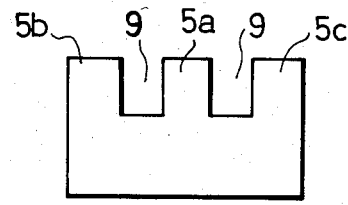
Figure 5C:
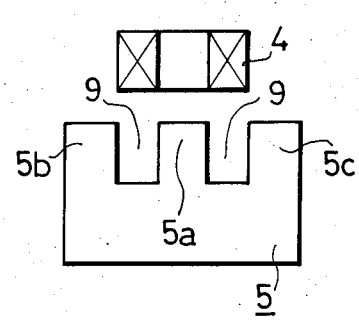

On the other hand, a rectangular bar 8 made of a soft magnetic material such as ferrite, Sendust, laminated Permalloy or the like and shown in FIG. 5(a) is provided with two grooves 9 as shown in FIG. 5(b) to provide a central leg 5a and two side legs 5b separated from each other by the two grooves 9. The bar 8 is then sliced into pieces each having a desired thickness, and an electromagnetic coil 4 is then inserted in the groovess 9 of each piece, as shown in FIG. 5(c).

Figure 5D:
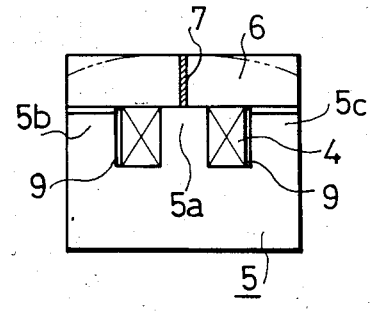

A magnetic core 5 thus formed is then combined with a guard member 6 produced as described above, and sliced into a thickness similar than that of the magnetic core 5. More specifically, the guard member 6 is at a position wherein the thin magnetic layer 7 formed approximately at the center of the guard member 6 is brought into contact with the central leg 5a of the magnetic core 5, and bonded to the magnetic core 5 by use of glass or the like. Lastly, the product thus obtained is subjected to a grinding process for providing curved surfaces on the upper sides of the guard member 6, as shown in FIG. 5(d).

According to the present invention, since the thin magnetic layer 7 serving as a main magnetic pole is provided in the nonmagnetic guard member 6, there is no possibility of an annealing process carried out thereon impairing the magnetic property of the magnetic core as in the conventional magnetic head, and various advantages such as simplifying the construction and the production processes, facilitating the provision of the precision measurements, and reducing the number of the production steps can be thereby obtained.

Although the embodiment is constructed as described above, it is apparent that various modifications may be carried out within the scope of the present invention. For instance, the configuration of the grooves may be varied from that described above, or the side leg 5b of the magnetic core 5 may be eliminated entirely. Furthermore, the electromagnetic coil 4 may be wound directly around the central leg 5a, or may be wound around a bobbin which is inserted around the central leg 5a.

A second embodiment of the present invention will now be described with reference to FIGS. 6 through 8(b), wherein similar members as those in FIGS. 1 through 5(d) are designated by similar reference numerals.

Figure 6:
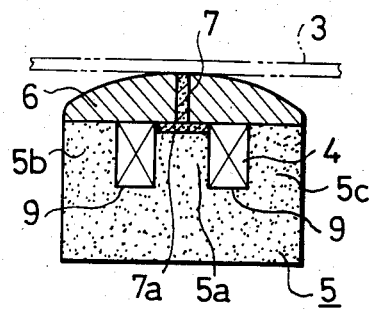
FIG. 6 is a vertical sectional view of a second embodiment of the invention.
Figure 7:
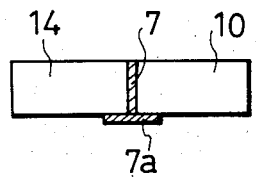
FIG. 7 is a diagram showing a production step for producing a non-magnetic member used in the embodiment shown in FIG. 6.

As shown in FIG. 6, a magnetic head constituting the second embodiment of the invention comprises a magnetic core 5 having a surface formed with a central leg 4a and two side legs 5b and 5c separated from each other by two grooves 9, an electromagnetic coil 4 embedded in the grooves 9, a guard member 6 made of a nonmagnetic material and secured to the aforementioned surface of the magnetic core 5, and thin magnetic layers 7 and 7a serving as a main magnetic pole. The thin layer 7 extends vertically to the upper surface of the central leg 5a, while the thin layer 7a extends horizontally in contact with the upper surface of the central leg 5a. Both side surfaces of the guard member 6 are formed into curved configurations so as to permit smooth contact thereof with a recording medium 3.

The magnetic head of the above described construction may be produced in a manner substantially the same as that described with respect to the first embodiment of the invention. That is, the thin magnetic layer 7 made of Permalloy, amorphous cobalt-zirconium or the like is formed on one side surface of a planar bar 10 by way of vapor deposition, sputtering, plating or the like (FIG. 4(b)). The bar 10 thus deposited with the thin magnetic layer 7 is then bonded with another bar 14 of the same material and configuration by use of a bonding agent such as glass. The magnetic thin layer 7a is then formed on the lower surface of the bars 10 and 14 in a manner similar to that described for the thin layer, so that the thin layer 7a extends horizontally while it is held in contact with the thin layer 7 (see FIG. 7). The combined bars 10 and 14 thus formed with the thin layers 7 and 7a are then subjected to an annealing process.

Figure 8A:
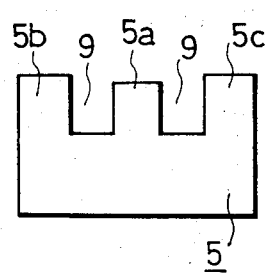
FIGS. 8(a) and 8(b) are diagrams showing production steps for a magnetic core used in the embodiment shown in FIG. 6.
Figure 8B:
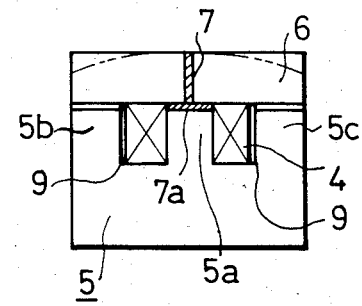

On the other hand, on the upper surface of a rectangular bar 8 made of ferritte, Sendust, laminated Permalloy or the like are formed a central leg 5a and two side legs 5b and 5c separated from each other by grooves 9 as shown in FIG. 8(a). The central leg 4a has a height slightly lower than that of the side legs 5b and 5c. The core-forming bar 8 is then sliced into a desired thickness, and the electromagnetic coil 4 is inserted in the grooves 9 of each sliced piece.

A magnetic core 5 thus formed is then placed on the lower side of the guard member 6 produced as described above and sliced into a thickness equal to that of the magnetic core 5, and is bonded together by a bonding agent such as glass. In this case, the magnetic thin layer 7a formed in the central part of the guard member 6 is brought into a position overlying the central leg 5a of the magnetic core 5 so as to widen the contact area between the magnetic core and the thin magnetic layers 7 and 7a. The side surfaces of the guard member 6 are then formed into curved configurations shown by dotted line in FIG. 8(b) by subjecting the guard member 6 to a grinding process.

The second embodiment described above has an advantage of widening the contact area between the thin magnetic layers 7 and 7a and the magnetic core 5, and reducing the magnetic reluctance of the magnetic head.

A third embodiment of the present invention will now be described with reference to FIGS. 9 through 11 wherein members similar to those shown in FIGS. 1 through 5 are designated by similar reference numerals. As shown in FIG. 9, the magnetic head comprises a magnetic core 5 formed with a central leg 4a and two side legs 5b and 5c on one surface of the magnetic core 5. Two grooves 9 are formed on both sides of the central leg 5a to separate the leg 5a from the side legs 5b and 5c. The central leg 5a has a stepped portion 15 defined between a high level portion 15a and a low level portion 15b. An electromagnetic coil 4 is embedded in the grooves 9. A guard member 6 made of a nonmagnetic material is bonded to the magnetic core 5. The guard member 6 has a stepped portion 16 complementary with the stepped portion 15 fitted thereto as shown in FIG. 9. A thin magnetic layer 7 operable as a main magnetic pole is deposited vertically along the stepped portion 16 of the guard member 6. The lower portion of the thin magnetic layer 7 contacts magnetic core 5 at the stepped portion 15 of the central leg 5a. Both side surfaces of the guard member are formed into curved configurations adapted to assure a smooth contact thereof with a recording medium 3.

The magnetic head constituting the third embodiment of the invention may be produced in accordance with production steps that are similar to those described above with respect to the first embodiment of the invention, in that the thin magnetic layer 7 is deposited on a side surface of the planar bar 10 by way of vapor deposition, sputtering, plating or the like (see FIG. 4(b)). The planar bar 10 thus deposited with the thin magnetic layer 7 is then subjected to an annealing process step. Another bar 14 made of the same material as that of the planar bar 10, but having a thickness smaller than that of the bar 10 is bonded onto the thin magnetic layer 7 formed on the planar bar 10 by use of a bonding agent such as glass of the like. In this manner the stepped portion 16 is formed along the bonded portion between the two bars 10 and 14 (see FIG. 10), while a lower portion of the thin magnetic layer 7 is exposed.

On the other hand, a central leg 5a and two side legs 5b and 5c are formed on one surface of a core-forming bar 8 made of a soft magnetic material. Two grooves 9 are formed on both sides of the central leg 5a to separate the leg 5a from the side legs 5b and 5c. The high level portion 15a, low level portion 15b and the stepped portion 15 defined between the two portions 15a and 15b are further formed on the outer surface of the central leg 5a as shown in FIG. 11(a). The core-forming bar 8 is then sliced into a desired thickness, and an electromagnetic coil 4 is inserted in the groove 9 of the sliced piece.

On the upper surface of the magnetic core thus provided, the guard member 6 produced as described above and sliced into a thickness equal to that of the magnetic core 5 is placed and bonded thereto by use of a bonding agent such as glass. In the bonded state, the thin magnetic layer 7 provided approximately in the central position of the nonmagnetic guard member 6 is placed on the exposed central leg 5a such that the lower portion of the thin layer 7 extends to the low level portion 15b of the stepped portion 15. As a consequence, the contacting area between the magnetic core 5 and the thin magnetic layer 7 is widened. Lastly, the side surfaces of the guard member 6 are formed into curved configurations as shown by dotted in FIG. 11(d) through a grinding process.

With the above described construction of the magnetic head, it is apparent that the magnetic reluctance of the magnetic head can be reduced by the wide contact area provided between the magnetic thin layer 7 and the magnetic core.

We claim:

1. A magnetic head for recording vertically by a main magnetic pole oriented perpendicular to a horizontal surface of a recording medium, comprising:
   (a) a core body made of magnetic material having a central leg extending vertically therefrom with one end facing in the direction of the recording medium, means defining a recess adjacent said central leg for supporting an electromagnetic coil therein, and side legs spaced apart from said central leg;
   (b) a guard member made of non-magnetic material supported on one side thereof on said central and side legs of said core body, and having on an opposite side thereof a surface adapted to be placed in contact with said recording medium;
   (c) said guard member having formed therein a thin layer of magnetic material extending vertically therethrough from said one side to said opposite side to said contact surface acting as a main magnetic pole for vertical recording on said recording medium, said thin magnetic layer having one end placed in contact with said one end of said central leg of said core body.

2. A magnetic head according to claim 1, wherein said one end of said central leg has a horizontal end surface, and said end of said thin magnetic layer includes a thin horizontal portion of magnetic material placed in contact said end surface of said central leg.

3. A magnetic head as set forth in claim 2, wherein said non-magnetic member is made of a wear-resistant material, and the surface of said non-magnetic member contacting said recording medium is curved.

4. A magnetic head according to claim 2, wherein said core body is formed from a single magnetic core piece, and said recess defining means is constituted by a pair of grooves between said central leg and said side legs in which said electromagnetic coil is wound around said central leg.

5. A magnetic head according to claim 1, wherein said one end of said central leg has a stepped end surface, including a high horizontal portion, an intermediate vertical portion, and a low horizontal portion, and said one side of said guard member being correspondingly stepped such that a vertical portion of said one end of said thin magnetic layer is placed in contact with said intermediate vertical portion of said central leg.

6. A vertical reocrding magnetic head as set forth in claim 5, wherein said non-magnetic member is made of a wear-resistant material, and the surface of said non-magnetic member contacting said recording medium is curved.

7. A magnetic head according to claim 5, wherein said core body is formed from a single magnetic core piece, and said recess defining means is constituted by a pair of grooves between said central leg and said side legs in which said electromagnetic coil is wound around said central leg.

8. A magnetic head as set forth in claim 1, wherein said non-magnetic member is made of a wear-resistant material, and the surface of said non-magnetic member contacting said recording medium is curved.

9. A magnetic head according to claim 1, wherein said core body is formed from a single magnetic core piece, and said recess defining means is constituted by a pair of grooves between said central leg and said side legs in which said electromagnetic coil is wound around said central leg.

* * * * *